(12) United States Patent
Pekala

(10) Patent No.: US 6,704,192 B2
(45) Date of Patent: Mar. 9, 2004

(54) ELECTRICALLY CONDUCTIVE, FREESTANDING MICROPOROUS SHEET FOR USE IN AN ULTRACAPACITOR

(75) Inventor: Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 0 days.

(21) Appl. No.: 09/975,288

(22) Filed: Oct. 10, 2001

(65) Prior Publication Data

US 2002/0080553 A1 Jun. 27, 2002

Related U.S. Application Data

(63) Continuation-in-part of application No. 09/507,174, filed on Feb. 18, 2000, now Pat. No. 6,524,742.
(60) Provisional application No. 60/239,536, filed on Oct. 10, 2000, and provisional application No. 60/120,842, filed on Feb. 19, 1999.

(51) Int. Cl.[7] ................................................. H01G 9/00
(52) U.S. Cl. ....................... 361/502; 361/503; 361/504; 361/508; 361/512; 361/523; 29/25.03
(58) Field of Search ................................ 361/502, 503, 361/508, 509, 523, 525, 528, 518, 519, 504, 510, 512; 29/25.03

(56) References Cited

U.S. PATENT DOCUMENTS

| | | | |
|---|---|---|---|
| 4,668,595 A | 5/1987 | Yoshino et al. ............ 429/194 |
| 5,028,500 A | 7/1991 | Fong et al. ................ 429/194 |
| 5,143,805 A | 9/1992 | Anderman et al. ......... 429/217 |
| 5,230,949 A * | 7/1993 | Howard et al. | |
| 5,296,318 A | 3/1994 | Gozdz et al. ............... 429/192 |
| 5,418,091 A | 5/1995 | Gozdz et al. ............... 429/252 |
| 5,456,000 A | 10/1995 | Gozdz et al. ............... 29/623.2 |
| 5,714,279 A | 2/1998 | Zajac, Jr. et al. ........... 429/194 |
| 5,744,264 A | 4/1998 | Barker ........................ 429/218 |
| 5,748,438 A * | 5/1998 | Davis et al. | |
| 5,748,439 A * | 5/1998 | MacFarlane et al. | |
| 5,751,541 A * | 5/1998 | Li et al. | |
| 5,871,865 A | 2/1999 | Barker et al. ............... 429/223 |
| 5,879,836 A | 3/1999 | Ikeda et al. ................ 429/231.8 |
| 5,910,378 A | 6/1999 | Debe et al. ................. 429/42 |
| 5,922,411 A * | 7/1999 | Shimizu et al. | |
| 6,171,723 B1 | 1/2001 | Loch et al. | |
| 6,201,685 B1 * | 3/2001 | Jerabek et al. | |
| 6,212,061 B1 * | 4/2001 | Irwin et al. | |
| 6,212,062 B1 | 4/2001 | Day et al. .................. 361/502 |
| 6,252,762 B1 * | 6/2001 | Amatucci | |
| 6,433,996 B1 * | 8/2002 | Hata et al. | |

OTHER PUBLICATIONS

Ashley, Steven, *Surging ahead with ultracapacitors*, Mechanical Engineering, Feb. 1995, pp. 76–79.

Pekala, R. W. et al., *The Aerocapacitor*, Lawrence Livermoore Labs Internal Reference, pp. 88–90.

Mayer, S. T., Pekala, R. W., Kaschmitter, J. L., *The Aerocapacitor: An Electrochemical Double–Layer Energy–Storage Device*, J. Electrochem Soc., vol. 140, No. 2, 1993, pp. 446–451.

Burke, Andrew, *Ultracapacitors: why, how, and where is the technology*, Journal of Power Sources, vol. 91, 2000, pp 37–50.

\* cited by examiner

*Primary Examiner*—Anthony Dinkins
*Assistant Examiner*—Nguyen Ha
(74) *Attorney, Agent, or Firm*—Stoel Rives LLP

(57) ABSTRACT

A freestanding, microporous polymer sheet is composed of a polymer matrix binding an electrically conductive matrix. The polymer matrix preferably includes UHMWPE, and the electrically conductive matrix preferably contains one of a carbonaceous material and a metal oxide, or a combination thereof. The UHMWPE is of a molecular weight that provides sufficient molecular chain entanglement to form a sheet with freestanding characteristics. Multiple microporous sheets can be wound or stacked in a package filled with an electrolyte to function as electrodes in an energy storage device, such as a battery or an ultracapacitor.

16 Claims, 3 Drawing Sheets

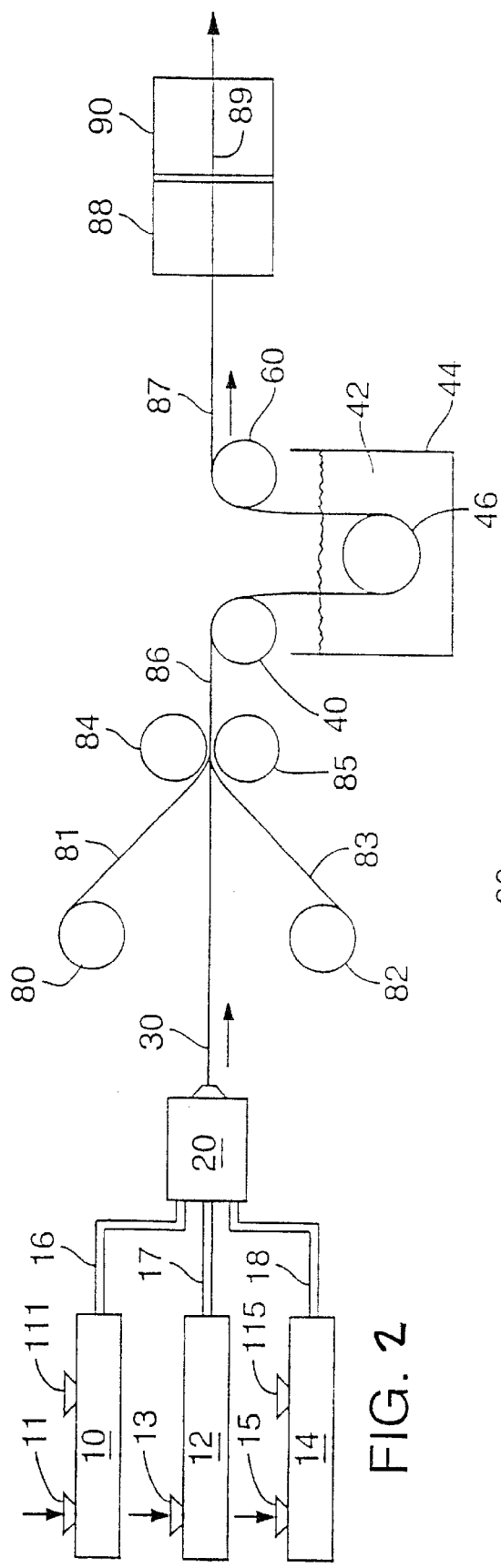
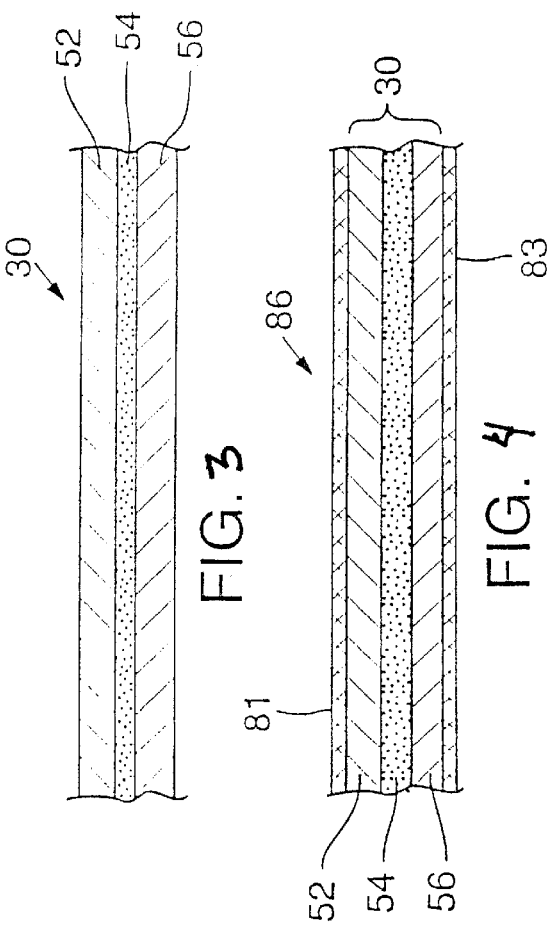
FIG. 2
FIG. 3
FIG. 4

ELECTRICALLY CONDUCTIVE, FREESTANDING MICROPOROUS SHEET FOR USE IN AN ULTRACAPACITOR

RELATED APPLICATIONS

This application is a continuation in part of application Ser. No. 09/507,174, filed Feb. 18, 2000, now U.S. Pat. No. 6,524,742 which claimed priority from U.S. provisional patent application No. 60/120,842, filed Feb. 19, 1999. This application also claims priority from U.S. provisional patent application No. 60/239,536, filed Oct. 10, 2000.

TECHNICAL FIELD

This invention relates to the formation of an electrically conductive, freestanding microporous polymer sheet and, in particular, to such a sheet for use in the manufacture of energy storage and other suitable devices including supercapacitors, pseudocapacitors, electrochemical capacitors, double layer capacitors, electrochemical double layer capacitors, hybrid capacitors, asymmetric capacitors, and ultracapacitors.

BACKGROUND OF THE INVENTION

The following background information is presented by way of example with reference to the manufacture of electrodes used in energy storage devices. Descriptions of the construction details of energy storage devices relevant to the present invention are set forth in A. Burke, Ultracapacitors: why, how, and where is the technology, *J. Power Sources* 91, (2000) pp. 37–50.

Ultracapacitors differ from batteries in that they provide higher power density, excellent reversibility, and very long cycle life. Exemplary charge-storage mechanisms of ultracapacitors include double layer capacitance and charge transfer pseudocapacitance. Double layer capacitance arises from the separation of charge at a solid-electrolyte interface, whereas pseudocapacitance involves reversible faradaic reactions occurring at a solid surface over a defined potential range.

Significant effort has been devoted to research focusing on the use of high surface area carbon powders as the electrochemically active material in ultracapacitors. While some of these powders have specific capacitance values in excess of 100 Farads/gram, their low densities provide a much lower volumetric capacitance values, which are of importance in ultracapacitor fabrication. Furthermore, the micropores (<2 nm diameter) of activated carbons are often not accessible to the electrolyte in an ultracapacitor, resulting in no double layer formation and lower than expected capacitance. Carbon aerogels are a unique form of carbon derived from the sol-gel polymerization of organic monomers, such as resorcinol and formaldehyde, followed by pyrolysis at elevated temperature (>800° C.). As discussed in Pekala et al., Structure and Performance of Carbon Aerogel Electrodes, *Materials Research Society Symposium Proceedings* 349, (1994) pp. 79–85, carbon aerogels can be synthesized over a wide range of densities with high surface areas (600–800 m²/g), a predominance of mesopores (2–50 nm), and low electrical resistivity. This microstructure provides high volumetric capacitance values for carbon aerogel monoliths and powders. As such, the incorporation of carbon aerogels into a free-standing, microporous polymer sheet is of great interest as a new method for the fabrication of ultracapacitor electrodes.

Many transition metal oxides and mixed metal oxides have also been investigated as electrochemically active materials for ultracapacitors where the principal charge-storage mechanism is pseudocapacitance. Certain forms of ruthenium oxide have specific capacitance values as high as 750 Farads/gram. Other metal oxides such as tantalum oxide, manganese dioxide, lead oxide, and nickel oxide are under investigation. In each case, the incorporation of these materials into a freestanding, microporous polymer sheet has not been contemplated for the fabrication of ultracapacitor electrodes.

Ultracapacitors can also be fabricated with one electrode being of a double layer material (e.g., activated carbon) while the other electrode is made from a pseudocapacitance material (e.g., ruthenium oxide). Such energy storage devices are referred to as hybrid or asymmetric capacitors.

Electrode preparation for many energy storage devices begins with the formation of a slurry containing an electrochemically active material in powder form, a fluoropolymer, and solvent. The slurry is coated onto a metal foil that acts as a current collector. The metal foil coated with the electrochemically active material is then passed through a drying oven to remove the solvent. The fluoropolymer acts as a binder that holds together the electrochemically active material and forms a porous electrode. Often the electrode is calendered to densify the electrochemically active material coated on the current collector by increasing the volume or packing fraction of the electrochemically active material and thereby reducing the porosity of the electrode. The current collector functions also as a carrier for the electrochemically active material and the binder because the combination of the two of them is of insufficient mechanical integrity to stand on its own as a freestanding, microporous polymer sheet. The electrode is then cut into ribbons for winding or stacking into a packaged energy storage device.

Fluoropolymers, such as polyvinylidene fluoride, have historically been used as polymer binders because of their electrochemical and chemical inactivity in relation to most polymer, gel, or liquid electrolytes. However, it is difficult, if not impossible, to produce freestanding porous electrodes utilizing fluoropolymers at traditional binder contents (2–10 wt. %) because their low molecular weights provide inadequate chain entanglement. Other binders such as EPDM rubber and various types of polyethylene can be used, but they also do not provide microporous sheets with freestanding properties. "Freestanding" refers to a sheet having sufficient mechanical properties that permit manipulation such as winding and unwinding in sheet form for use in an energy storage device assembly.

A special type of polyethylene, ultrahigh molecular weight polyethylene (UHMWPE), can be used to make a microporous sheet with freestanding properties at the binder contents specified above. The repeat unit of polyethylene is shown below:

$(-CH_2CH_2-)_x$, where x represents the average number of repeat units in an individual polymer chain. In the case of polyethylene used in many film and molded part applications, x equals about $10^3$–$10^4$ whereas for UHMWPE x equals about $10^5$. This difference in the number of repeat units is responsible for the higher degree of chain entanglement and the unique properties of UHMWPE.

One such property is the ability of UHMWPE to resist material flow under its own weight when the UHMWPE is heated above its crystalline melting point. This phenomenon is a result of the long relaxation times required for individual chains to slip past one another. UHMWPE exhibits excellent chemical and abrasion resistance, and the hydrocarbon composition of UHMWPE has a much lower skeletal density (0.93 g/cc) than many of the fluoropolymers commonly used in electrode preparation. Such commonly used fluoropolymers include polyvinylidene fluoride (1.77 g/cc) and polytetrafluoroethylene (2.2 g/cc).

UHMWPE is commonly used as the polymer matrix or binder for separators used in lead-acid batteries. Such separators result from the extrusion, calendering, and extraction of mixtures containing UHMWPE, precipitated silica, and processing oil. The resultant separators have many advantages: high porosity (50–60%), a dentritic growth-inhibiting ultrafine pore size, low electrical resistance, good oxidation resistance, and sealability into a pocket configuration. These separators usually contain a silica to UHMWPE weight ratio from about 2.5 to about 3.5 or a corresponding volume fraction ratio in the range of 1.0 to 1.5. Such separators are designed to prevent electronic conduction (i.e., short circuits) between the anode and cathode while permitting ionic conduction via the electrolyte that fills the pores.

While UHMWPE is an integral part of separator technology, its use in the extrusion and extraction of freestanding, electrically conductive porous film electrodes has never been achieved. This invention addresses the desire to fabricate such film electrodes for use in energy storage and other electronic device applications.

SUMMARY OF THE INVENTION

An object of the present invention is, therefore, to provide an electrically conductive, freestanding microporous polymer sheet formed with a relatively high volume fraction of the electrically conductive matrix (composed of an electrochemically active powder and an electrically conductive agent, if required) to the polymer matrix and having sufficient mechanical properties for use as ultracapacitor electrodes. An electrochemically active powder is one that exhibits sufficient double-layer capacitance or pseudocapacitance for the purpose of this invention.

The present invention is a freestanding, microporous polymer sheet that is composed of a polymer matrix binding a material composition (i.e., the electrically conductive matrix) having electrical conductivity properties. The polymer matrix preferably includes UHMWPE, and the material composition preferably contains one of a carbonaceous material and a metal oxide, or a combination thereof. Exemplary carbonaceous materials include high surface area carbon (>250 m$^2$/g), activated carbon, and carbon aerogel. Exemplary metal oxides include ruthenium oxide, tantalum oxide, manganese dioxide, nickel oxide, and lead oxide. The UHMWPE is of a molecular weight that provides sufficient molecular chain entanglement to form a sheet with freestanding characteristics, and the material composition powders have relatively high surface areas. Preferably, the polymer matrix of the microporous sheet does not exceed a volume fraction of about 0.20.

Multiple microporous sheets can be wound or stacked in a package filled with an electrolyte to function as electrodes in an energy storage device, such as a battery or an ultracapacitor. Metallic layers can be applied to the microporous sheets to function as current collectors in such devices.

In a first preferred embodiment of the invention, the freestanding, microporous polymer sheet is manufactured by combining UHMWPE, a material composition in powder form and having electrical conductivity properties, and a plasticizer (e.g., mineral oil). A mixture of UHMWPE and the material composition powder is blended with the plasticizer in sufficient quantity and extruded to form a homogeneous, cohesive mass. A blown film process or another traditional calendering method is used to shape the oil-filled sheets to their final thicknesses. In an extraction operation similar to that used for the production of lead acid battery separators, the oil is removed from the sheets. Metallic layers are then applied to the extracted sheets to form current collectors. A metallic layer can be one of a metal film formed by sputter deposition on, electroless deposition on, electrodeposition on, plasma spraying on, or roll coating of a metal slurry on the microporous sheet; or a porous or nonporous metal foil laminated to the microporous sheet. In some cases, sufficient metal powder can be incorporated in the polymer sheet such that a metallic layer as described above is not required.

In a second preferred embodiment of the invention, a polymer matrix, containing an UHMWPE in an amount and of a molecular weight sufficient to provide the necessary molecular chain entanglement to form a freestanding microporous sheet, binds a material composition having electrical conductivity properties. The resulting electrically conductive sheet is wound or stacked in a package, and the pores of the sheet are filled with an electrolyte and used as one of many electrodes in an energy storage device, for example, a battery, capacitor, supercapacitor, or fuel cell. One of the benefits of this polymer matrix is that it can be used to form, and potentially provide intimate contact between adjacent electrode and separator layers.

In a third preferred embodiment of the invention, multiple electrode and separator layers are coherently bonded to one another to form an ultracapacitor. One preferred method of coherently bonding the multiple layers involves simultaneously coextruding the layers through multiple extruders. A second preferred method involves laminating individual layers together. These processes promote an integral, coherent bond between adjacent electrode and separator layers and reduce the risk of delamination during extraction. These processes also provide intimate contact between the porous electrodes and the separator without collapsing porosity at adjacent layer interfaces. The resultant multiple layer ribbon with one or more current collectors is cut to size, and the pores are filled with electrolyte to produce an energy storage device.

Additional objects and advantages of this invention will be apparent from the following detailed description of preferred embodiments thereof which proceeds with reference to the accompanying drawings.

BRIEF DESCRIPTION OF THE DRAWINGS

FIG. 2 is a schematic diagram showing a continuous process for forming the cell assemblies of this invention.

FIG. 3 is a fragmentary cross-sectional view of the electrode assembly of this invention.

FIG. 4 is a fragmentary cross-sectional view of an electrochemical cell incorporating the electrode assembly of this invention.

DETAILED DESCRIPTION OF PREFERRED EMBODIMENTS

Figure 1:
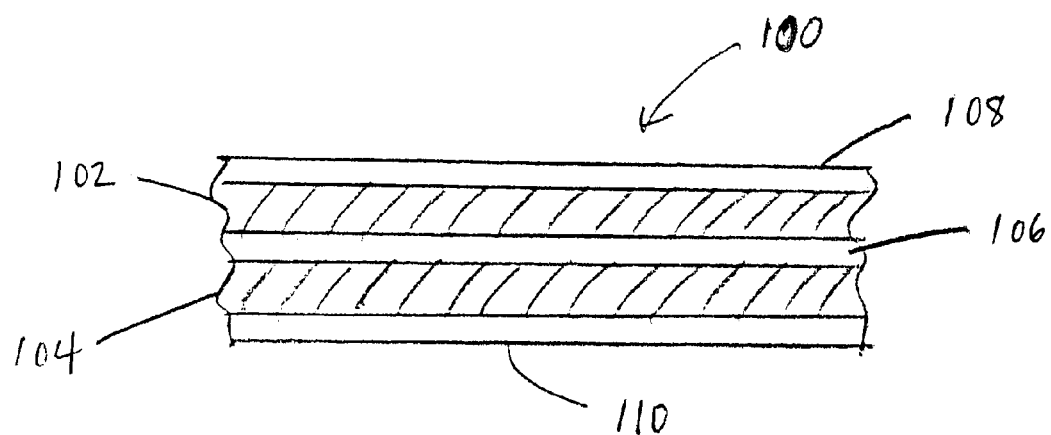
FIG. 1 is a fragmentary cross-sectional side view of a capacitor cell of the present invention.

As used herein, the term ultracapacitor includes supercapacitors, pseudocapacitors, electrochemical capacitors, double layer capacitors, electrochemical double layer capacitors, hybrid capacitors, and asymmetric capacitors.

The polymeric material preferably used in this invention is an ultrahigh molecular weight polyolefin. The polyolefin most preferably used is an ultrahigh molecular weight polyethylene (UHMWPE) having an intrinsic viscosity of at least 10 deciliter/gram, and preferably greater than about 14–18 deciliters/gram. It is not believed that there is an upper limit on intrinsic viscosity for the UHMWPEs usable in this invention. Current commercially available UHMW-PEs have an upper limit of intrinsic viscosity of about 29 deciliters/gram.

The plasticizer employed in the present invention is a nonevaporative solvent for the polymer, and is preferably a liquid at room temperature. The plasticizer has little or no solvating effect on the polymer at room temperature; it performs its solvating action at temperatures at or above the softening temperature of the polymer. For UHMWPE, the solvating temperature would be above about 160° C., and preferably in the range of between about 160° C. and about 220° C. It is preferred to use a processing oil, such as a paraffinic oil, naphthenic oil, aromatic oil, or a mixture of two or more such oils. Examples of suitable processing oils include: oils sold by Shell Oil Company, such as ShellFlex™ 3681, Gravex™ 41, Catnex™ 945; and oils sold by Chevron, such as Chevron 500R; and oils sold by Lyondell, such as Tufflo™ 6056.

Any solvent for extracting the processing oil from the individual films or multiple layer film may be used in the extraction process, so long as the solvent is not deleterious to the electrode active ingredients contained in the polymer matrix and has a boiling point that makes it practical to separate the solvent from the plasticizer by distillation. Such solvents include 1,1,2 trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In some cases, it is desirable to select the processing oil such that any residual oil in the polymer sheet after extraction is electrochemically inactive.

A first preferred embodiment of the present invention is use of the freestanding microporous film as a composition. The terms "film" and "sheet" are used interchangeably throughout this patent application to describe products made in accordance with the invention, and the term "web" is used to encompass films and sheets. The practice of the invention is not limited to a specific web thickness. The present invention forms a freestanding microporous polymer sheet, which is manufactured by combining an UHMWPE, an electrochemically active powder and an electrically conductive agent (e.g., carbon black), if required, with sufficient plasticizer at an appropriate temperature to allow formation of a homogeneous, cohesive sheet. The electrochemically active powders used to form these sheets vary widely. Some examples are as follows:

EXAMPLE 1

Production of a Granulated Carbon-Containing Sheet

UHMWPE (1900 HCM; Basel Polyolefins, 1.0 g) was added to granulated carbon powder (ENSACO 350; MMM Carbon, 10.0 g having a surface area of about 800 $m^2/g$) in a 250 ml plastic beaker. The powders were blended with a spatula until a homogeneous mixture formed, at which time ShellFlex™ 3681 process oil (Shell Oil Co., 25.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (13.4 g) was added to the mixing chamber. The resultant mixture was compounded for five minutes, resulting in a homogeneous, cohesive mass. This mass was transferred to a C.W. Brabender Prep-Mill Model PM-300, two-roll mill, turning at 15 rpm and set at 150° C. The roll gap was adjusted to about 0.3 mm, and the resulting polymer sheet was removed from the rolls with a take-off knife.

The sheet was allowed to cool to room temperature, and then a razor blade was used to cut 40 mm×60 mm specimens from the sheet. The specimens were next placed in a 500 ml trichloroethylene bath in which a magnetic stir bar was used to circulate the solvent, thereby promoting extraction of the ShellFlex™ 3681 oil. This procedure was repeated three times with fresh trichloroethylene to ensure that the oil was fully extracted from the specimens. The trichloroethylene-laden specimens were dried in a fume hood for five minutes at 20° C., followed by 15 minutes at 90° C. in a forced air oven.

The resultant porous sheet having a 0.29 mm thickness was weighed and measured to determine its density, which was recorded as 0.41 g/cc.

EXAMPLE 2

Production of an Activated Carbon-Containing Sheet

UHMWPE (1900 HCM; Basel Polyolefins, 1.0 g) was added to activated carbon powder (Norit SX Ultra; NORIT Americas Inc., 10.0 g having a surface area of about 1150 $m^2/g$) in a 250 ml plastic beaker. The powders were blended with a spatula until a homogeneous mixture formed, at which time ShellFlex™ 3681 process oil (Shell Oil Co., 12.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (6.9 g) was added to the mixing chamber. The resultant mixture was compounded for five minutes, resulting in a homogeneous, cohesive mass. This mass was transferred to a C.W. Brabender Prep-Mill Model PM-300, two-roll mill, turning at 15 rpm and set at 150° C. The roll gap was adjusted to about 0.3 mm, and the resulting polymer sheet was removed from the rolls with a take-off knife.

The oil-filled sheet was extracted as outlined in Example 1.

The resultant porous sheet having a 0.30 mm thickness was weighed and measured to determine its density, which was recorded as 0.43 g/cc.

EXAMPLE 3

Production of a Manganese Dioxide-Containing Sheet

UHMWPE (1900 HCM; Basel Polyolefins, 2.6 g) and graphite powder (BG-35, Superior Graphite Co., 4.0 g) were added to manganese dioxide powder (alkaline battery grade; Kerr-McGee Chemical LLC., 32.0 g) in a 250 ml plastic beaker. The powders were blended with a spatula until a homogeneous mixture formed, at which time ShellFlex™ 3681 process oil (Shell Oil Co., 8.0 g) was added. The oil-containing mixture was stirred until a free-flowing state was achieved, and then the mixture was placed into a HAAKE Rheomix 600 miniature intensive mixer fitted with roller blades and driven by a HAAKE Rheocord 90 torque Rheometer, turning at 80 RPM and set at 180° C. Additional oil (12.0 g) was added to the mixing chamber. The resultant mixture was compounded for five minutes, resulting in a homogeneous, cohesive mass. This mass was transferred to a C.W. Brabender Prep-Mill Model PM-300, two-roll mill, turning at 15 rpm and set at 150° C. The roll gap was adjusted to about 0.4 mm, and the resulting polymer sheet was removed from the rolls with a take-off knife.

The oil-filled sheet was extracted as outlined in Example 1

The resultant porous sheet having a 0.39 mm thickness was weighed and measured to determine its density, which was recorded as 1.27 g/cc.

EXAMPLE 4

Production of Carbon Aerogel-Containing Sheet

Carbon aerogel powder (<20 µm particle size; Ocellus Technologies Inc., 18.0 g) was added to ultrahigh molecular weight polyethylene [UHMWPE](1900 H; Basel Polyolefins, 1.08 g) in a 250 ml plastic beaker. The powders were blended with a spatula to form a homogeneous mixture, at which time ShellFlex™ 3681 process oil (Shell Oil Co., 12.0 g) was added. The oil-containing mixture was stirred until a free-flowing state was achieved, and then the mixture was placed in a HAAKE Rheomix 600 miniature intensive mixer fitted with roller blades and driven by a HAAKE Rheocord 90 torque Rheometer, turning at 80 RPM and set at 180° C. Additional oil (8.0 g) was added to the mixing chamber. The resultant mixture was compounded for 5 minutes, resulting in a homogeneous, cohesive mass. This mass was transferred to a C.W. Brabender Prep-Mill Model PM-300, two-roll mill, turning at 15 rpm and set at 160° C. The roll gap was adjusted to about 0.25 mm, and a sheet was removed from the rolls with the take-off knife after lowering the roll temperature to 140° C.

The oil-filled sheet was allowed to cool to room temperature, and then a razor blade was used to cut 50 mm×250 mm specimens from the sheet. The specimens were next placed in a 500 ml trichloroethylene bath in which a magnetic stir bar was used to circulate the solvent, thereby promoting extraction of the Shellflex™ 3681 oil. This procedure was repeated three times with fresh trichloroethylene to ensure that the oil was fully extracted from the specimen. The trichloroethylene-laden specimens were dried in a fume hood for five minutes at 20° C., followed by 15 minutes at 90° C. in a forced air oven.

After extraction, the resultant porous sheet had a density of 0.62 g/cc.

EXAMPLE 5

Production of Carbon Aerogel-Containing Sheet

Using the same procedure as outlined in Example 4, porous sheet was formed from a mixture containing carbon aerogel powder (<20 µm particle size; Ocellus Technology Inc., 17.28 g), UHMWPE (1900 H; Basel Polyolefins, 1.08 g), conductive black (Super P™; MMM Carbon, 0.72 g), and Shellflex™ 3681 oil (Shell Oil Co., 20.0 g.)

After extraction, the resultant porous sheet had a density of 0.67 g/cc.

EXAMPLE 6

Production of Carbon Aerogel-Containing Sheet

Using the same procedure as outlined in Example 4, a porous sheet was formed from a mixture containing carbon aerogel powder (Ocellus Technology Inc., 14.7 g), UHMWPE (1900 H; Basel Polyolefins, 1.64 g), and Shellflex 3681 oil (Shell Oil Co., 20.0 g.)

After extraction, the resultant porous sheet had a density of 0.45 g/cc.

EXAMPLE 7

Production of Carbon Aerogel-Containing Sheet

Using the same procedure as outlined in Example 4, a porous sheet was formed from a mixture containing carbon aerogel powder (Ocellus Technology Inc., 21.56 g), UHMWPE (1900 H; Basel Polyolefins, 2.4 g), and Shellflex™ 3681 oil (Shell Oil Co., 20.0 g.)

After extraction, the resultant porous sheet had a density of 0.68 g/cc.

A second preferred embodiment of the invention is directed to use of the freestanding microporous polymer sheet in an energy storage device. The polymer sheet is especially useful in such devices because it is freestanding, porous, electrically conductive, and electrochemically active. Energy storage devices in which the invention can be used include, but are not limited to ultracapacitors, batteries, and fuel cells.

A preferred implementation of this second preferred embodiment is the use of the freestanding microporous polymer film in an ultracapacitor. Capacitors are electrical energy storage devices that store electrical energy on an electrode surface. Many traditional capacitors cannot store sufficient energy in the volume and weight available to provide significant energy. In contrast, ultracapacitors are able to store more energy per weight and to deliver energy at a higher power rating than traditional capacitors. Ultracapacitors create and store energy by microscopic charge separation at an electrode-electrolyte interface or through charge-storage based on fast, reversible faradaic reactions occurring at an electrode surface. Specifically, an ultracapacitor includes two porous electrodes isolated from each other by a porous separator. The separator and electrodes are impregnated with an electrolyte that allows ionic current to flow between the electrodes. The capacitors of the present invention have a high volume fraction of the electrode active material in the microporous polymer matrix and thereby maintain low electronic resistivity. Potential ultracapacitor applications include pulse power delivery and load leveling in portable electronic devices and electric vehicles.

As shown in FIG. 1, ultracapacitor cell 100 includes a pair of electrodes 102 and 104, a separator 106, and a pair of current collector plates 108 and 110. Ultracapacitor 100 includes an ultrahigh molecular weight polyolefin, preferably UHMWPE, as a binder for the electrode active material. Preferably, the UHMWPE is present in an amount that does not exceed 20% by volume of the electrode. The active materials used in ultracapacitor 100 can be any particulate or fibrous material; however, preferred active materials include high surface area carbon, (>250 $m^2/g$), activated carbon, carbon aerogel, ruthenium oxides (either hydrous or anhydrous), tantalum oxides, manganese dioxide, nickel oxide, or lead dioxide.

The following examples are illustrative of use of the present invention in ultracapacitors.

EXAMPLE 8

Carbon Black, Ensaco 350 GR Capacitor

TABLE 1

|  | Electrode | Separator |
|---|---|---|
| Carbon Black[1], g | 11.0 |  |
| Silica[2], g |  | 7.0 |
| Colorant[3], g |  | 0.2 |
| Lubricant[4], g |  | 0.03 |
| Antioxidant[5], g |  | 0.03 |
| UHMWPE[6], g | 1.0 | 2.4 |
| Oil[7], 9 | 42.0 | 18.0 |

[1]Ensaco 350 GR, Erachem Europe
[2]Hi-Sil ® SBG precipitated silica, PPG Industries, Inc.
[3]ACC 10319E, Allied Color Industries, Inc.
[4]Petrac ® CZ-81, Synthetic Products Corp.
[5]Irganox ® B-215, Ciba-Geigy Corp.
[6]1900 HCM, Montell USA Inc.
[7]ShellFlex ™ 3681, Shell Oil Co.

The components of a carbon black, Ensaco 350 GR capacitor are set out in Table 1. The dry electrode ingredients in Table 1 were combined in a 600 ml tall form beaker and blended with a spatula. Oil (28 g) was then added to the beaker while blending with a spatula. Once thoroughly blended, this mixture formed a free flowing powder.

This free flowing powder was added to a HAAKE Rheomix 600 miniature intensive mixer fitted with roller blades and driven by a HAAKE Rheocord 90 torque Rheometer, turning at 80 RPM and set at 180° C. The remaining oil (14 g) was added to the miniature intensive mixer. This mixture was compounded for approximately five minutes, resulting in a homogeneous, cohesive mass. This mass was transferred to a C.W. Brabender Prep-Mill, Model PM-300, two-roll mill, turning at 15 rpm and set at 175° C. The roll gap was adjusted to about 0.4 mm, and a sheet was removed from the rolls with the take-off knife.

The procedure above was repeated for the separator formula with the following exceptions: oil (12 g) was blended with the dry ingredients in a 600 ml tall form beaker, additional oil (6 g) was added to the miniature intensive mixer, the temperature of the two-roll mill was approximately 173° C., and the gap on the two-roll mill was set to about 0.3 mm. An 8 cm×8 cm square was cut from this separator sheet, placed between aluminum foil cover sheets, transferred to a Carver Laboratory Press, at 143° C., and pressed to a thickness of 0.10 mm at a pressure of approximately 2,500 kPa. The film was allowed to cool to room temperature, and the aluminum foil cover sheets were removed.

Two 4 cm×6 cm rectangles were cut from the electrode sheet. One 6 cm×8 cm rectangle was cut from the separator film. Two 4 cm×6 cm current collectors with 2 cm×10 cm take-off tabs were cut from expanded titanium foil, 2Ti3.5–4/0A made by Exmet Corporation. This foil was 0.05 mm thick and had a strand thickness of 0.09 mm. The collectors, oil-filled sheets, and separator film were stacked in the following order: collector, electrode sheet, separator film, electrode sheet, and collector. This stack was then laminated in a Model C Carver Laboratory Press, at about 143° C. and at a pressure not greater than 100 kPa. This laminated capacitor assembly was extracted in a tall form 600 ml beaker of trichloroethylene with a magnetic stir bar turning at 100 rpm. This procedure was repeated three times with fresh trichloroethylene to ensure that the oil was fully extracted. The trichloroethylene-laden capacitor was dried in a fume hood for five minutes at 20° C., followed by 15 minutes at 90° C. in a forced air oven.

The resultant porous capacitor assembly was immersed in a 250 ml specimen jar containing 1.28 sp. gr. $H_2SO_4$ electrolyte. The capacitor assembly and jar were placed in a vacuum desiccator, which was evacuated to a pressure of 125 mm of Hg for one minute, after which the vacuum was released. This evacuation release cycle was repeated five times. The saturated capacitor was placed in a 75 mm×125 mm polyethylene bag so that the current collectors protruded from the bag.

The capacitor collector tabs were connected to the terminals of a Hewlett Packard Model 6611C DC power supply. The power supply voltage limit was set to 1.2 volts, and the current limit was set to 1 ampere. The initial current was 71 milliamperes, decaying exponentially to 19 milliamperes after 10 minutes. After 10 minutes, the power supply was disconnected and the open circuit voltage of the capacitor was recorded. The initial open circuit voltage was 0.98 volt, decreasing to 0.65 volt 10 minutes after power supply disconnection. Although equipment necessary to quantify capacity in farads was unavailable, the behavior above is consistent with that of a functioning capacitor.

EXAMPLE 9

Aerogel Carbon, Ultracapacitor

An oil-filled sheet as described in Example 6 was laminated to a nickel expanded metal grid at approximately 140° C. using a Carver Press and subsequently extracted in trichloroethylene to form a porous electrode. The electrode/grid assembly was soaked in isopropanol and then placed in an excess of 5M KOH solution overnight so that 5M KOH would fill the pores, rather than isopropanol. A glass fiber separator filled with 5M KOH was then sandwiched between two electrode/grid assemblies to form a supercapacitor that was held under compression in a stainless steel fixture. The resultant ultracapacitor was charged at 0.1 A/g to 1.2 V and then held at this voltage for 1 hour.

EXAMPLE 10

Aerogel Carbon, Ultracapacitor

Using the same procedure as outlined in Example 9, a ultracapacitor was formed using two of the oil-filled sheets described in Example 7.

The ultracapacitors of Examples 9 and 10 were discharged at the rates shown in Table 2, and capacitance values were calculated from the discharge curves.

TABLE 2

| Electrodes | Capacitance (F/g) @ 0.1 A/g | Capacitance (F/g) @ 0.05 A/g | Capacitance (F/cc) @ 0.1 A/g | Capacitance (F/cc) @ 0.05 A/g | Z(real) milliohm |
|---|---|---|---|---|---|
| Example 9 | 12.7 | 21.0 | 5.2 | 8.5 | 116.9 |
| Example 10 | 13.3 | 14.1 | 8.1 | 8.7 | 67.3 |

A third preferred embodiment of the invention is a process of forming a multiple layer film composed of individual electrode and separator layers. The resultant multiple layer film with current collectors is cut to size and filled with electrolyte to produce an ultracapacitor.

FIG. 2 illustrates one preferred process of coherently bonding the multiple layers, which involves a simultaneous coextrusion of the layers through multiple extruders. The process illustrated in FIG. 2 employs three extruders and a coextrusion die.

An extruder 10 has a metering section containing a feed port 11 by means of which a suspension of a polymer in a non-evaporative plasticizer is fed into the extruder. Extruder 10 has a second metering section containing second feed port 111 by means of which an active material is fed into the second (down stream) metering section. Extruder 10 extrudes first porous electrode layer 102.

An extruder 12 has a metering section containing a feed port 13 by means of which a suspension of polymer and filler in a nonevaporative plasticizer is fed into the extruder. Extruder 12 extrudes separator layer 106. An extruder 14 has a metering section containing a feed port 15 by means of which a suspension of a polymer in a nonevaporative plasticizer is fed into the extruder. Extruder 14 has a second metering section containing second feed port 115 by means of which an active material is fed into the second (down stream) metering section. Extruder 14 extrudes second porous electrode layer 104.

Extruders 10, 12, and 14 are, preferably, twin screw extruders having mixing and conveying sections. The twin screw extruders may have screws that are either co-rotating or counter-rotating. The temperatures employed in the extruders are such as to ensure that the polymer is solvated by the plasticizer, but not so high as to cause degradation of any component of the slurry composition during its residence time in the extruder. Although twin screw extruders are preferred, other means for applying heat and shear to the various slurries may be used, such as, for example, a Farrel continuous mixer.

The first porous electrode layer extrudate is conveyed from extruder 10 to a coextrusion die 20 via a heated pipe 16; the separator extrudate is conveyed from extruder 12 to coextrusion die 20 via a heated pipe 17; and the second porous electrode layer extrudate is conveyed from extruder 14 to coextrusion die 20 via a heated pipe 18. Melt pumps may be used to feed the extrudates from extruders 10, 12, and/or 14 to coextrusion die 20.

Coextrusion die 20 may be either a sheet die or a blown film die. If a blown film is formed, its tubular construction may be slit into a wider, single thickness web before extraction of the plasticizer.

Although not illustrated, if a sheet die is used, it may be desirable to pass a resultant three-layer precursor film 30 through the nip of two or more calender rolls to aid in controlling film thickness and other properties. Alternatively, the hot precursor film 30 may be cast onto a quench roll and a series of draw down rolls used to control film thickness and other properties.

In addition, three-layer precursor film 30, whether formed in a blown film die, as a calendered film from a sheet die and calender stack, or as a melt cast film from a sheet die and quench roll, can be drawn in the machine and/or cross machine direction by means of a tentering frame to modify film thickness and other properties.

The three-layer film 30 formed by coextrusion die 20, with or without modification by various intermediate processes, is fed along with a first porous electrode layer current collector 81 and a second porous electrode layer current collector 83 into the nip of laminating rolls 84 and 85 to form a complete cell structure. The current collectors in roll stock form are supplied from unwind stations 80 and 82 to the laminating rolls.

A five-layer cell structure 86, which includes three-layer precursor film 30, is fed around roll 40 and into an extraction bath 42 contained in tank 44. The five-layer cell structure then passes around a roll 46 and exits tank 44. The portion of the five-layer cell structure 86 comprised of three-layer precursor film 30 has substantially all of the contained plasticizer removed by the solvent in extraction bath 42. The extracted five-layer cell structure passes around roll 60 and enters a drying section 88 where the solvent is volatilized.

The extracted solvent-free five-layer cell structure 89 passes into a controlled moisture environment 90 where the cell structure is cut to length, cut lengths are assembled into individual ultracapacitors, electrolyte is introduced, and other final assembly operations are carried out. When the cell structure is cut to length, the continuous portion of the ultracapacitor production ends.

The extraction process has been illustrated as being carried out in tank 44 for ease of illustration. However, the extraction is preferably carried out in an extractor similar to that described in U.S. Pat. No. 4,648,417. After extrusion, the resultant multiple layer cell structure can be further calendered to control porosity and layer thickness.

The continuously produced multiple (three)-layer cell assembly 30 (before extraction) and multiple (five)-layer electrochemical cell structure 89 are illustrated in FIGS. 3 and 4, respectively. As can be seen, cell structure 89 is comprised of a first porous electrode current collector 81, a first porous electrode layer 52, a separator layer 54, a second porous electrode layer 56, and a second porous electrode current collector 83.

Although the process of forming the multiple layer cell structure of this invention is preferably accomplished by coextruding the electrode layers and the separator; laminating current collectors; extracting the plasticizer; and removing the extraction solvent in a continuous series of operations, the operations can be performed separately or in various combinations. If the electrode and separator layers are formed separately, they are preferably laminated to each other and to their respective current collectors before solvent extraction of the plasticizer to promote coherent bonding between the adjacent layers. However, it may be desirable to extract the plasticizer from one or more of these layers in a separate operation and subsequently laminate the extracted layers. If the electrode and separator layers are formed separately, it may be desirable to pass the respective extrudate from each extruder through a calender roll stack to aid in controlling film thickness and other parameters. A suitable such calender roll stack is disclosed in U.S. Pat. No. 4,734,229. After solvent extraction of the plasticizer, the cell assembly is passed into a controlled moisture environment, as is well known in the art.

Whether the electrode and separator films are formed separately or as a multiple layer film, the film or films may be oriented (stretched) in the machine direction, cross-machine direction, or both, before or after solvent extraction of the plasticizer from the film but prior to lamination to current collectors.

After the electrochemical cell assembly is formed, the web is cut to size, packaged, and grouped into ultracapacitors. The packaged cell assemblies are then filled with electrolyte and sealed, all in a manner known in the art.

Ultracapacitors can be fabricated with one electrode being of a double-layer (carbon) material and the other electrode being of a pseudocapacitance material. Such devices are often referred to as hybrid capacitors. Most of the hybrid capacitors developed to date have used nickel oxide as the pseudocapacitance material in the positive electrode. The energy density of these devices can be significantly higher than for double-layer capacitors. Hybrid capacitors can also be assembled using two non-similar mixed metal oxide or doped conducting polymer materials.

Figure 5:
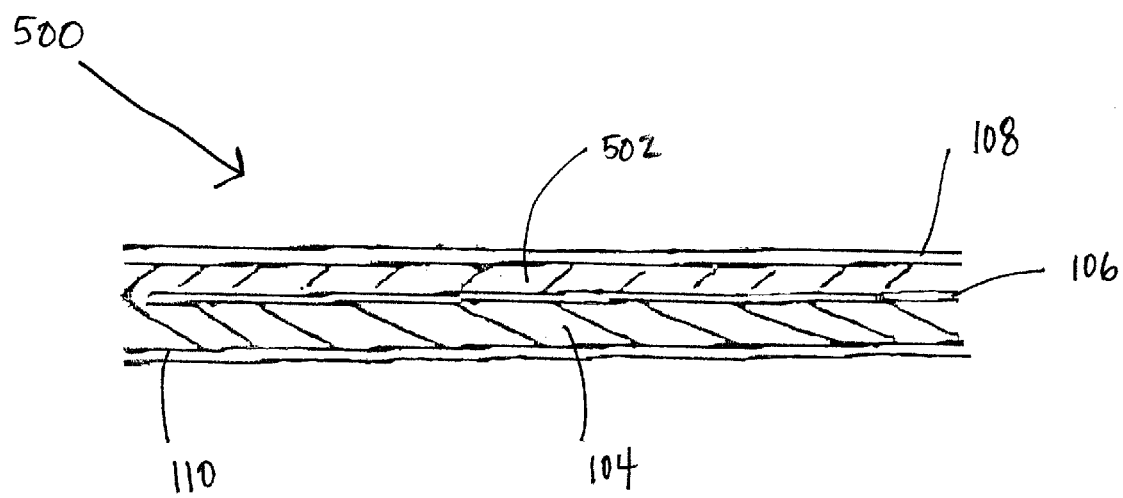
FIG. 5 is a schematic diagram of a hybrid capacitor.

FIG. 5 shows a schematic diagram of an exemplary hybrid ultracapacitor 500 in which separator 106 is positioned between a battery-like electrode 502 and a double-layer electrode 104. Current collectors 108 and 110 are positioned adjacent to electrodes 502 and 104, respectively.

It will be obvious to those having skill in the art that many changes may be made to the details of the above-described embodiments of this invention without departing from the underlying principles thereof. The scope of the present invention should, therefore, be determined only by the following claims.

What is claimed is:

1. A freestanding microporous polymer web, comprising:
a polymer matrix binding a material composition having electrical conductivity properties, the polymer matrix including an ultrahigh molecular weight polyolefin and the material composition having electrical conductivity properties and including one of a carbonaceous material and a metal oxide, or a combination thereof, and the ultrahigh molecular weight polyolefin being of a molecular weight that provides sufficient molecular chain entanglement to form a microporous web with freestanding characteristics.

2. The polymer web of claim 1, in which the ultrahigh molecular weight polyolefin is ultrahigh molecular weight polyethylene.

3. The polymer web of claim 2, in which the ultrahigh molecular weight polyethylene is present in an amount equal to or less than about 20 percent by volume.

4. The polymer web of claim 1, in which the carbonaceous material is one of carbon aerogel, activated carbon, and high surface area carbon.

5. The polymer web of claim 1, in which the metal oxide is one of ruthenium oxide, lead oxide, tantalum oxide, manganese dioxide, and nickel oxide.

6. The polymer web of claim 1, further including a metallic layer that is applied to the polymer web to form a metallized electric current collector.

7. The polymer web of claim 6, in which the metallic layer includes one of a metallic grid, perforated metal sheet, metal film, and metal foil.

8. The polymer web of claim 6, in which the metallic layer includes one of a metal film formed by sputter deposition on, electroless deposition on, electrodeposition on, plasma spraying on, or roll coating of a metal slurry on the microporous web; or a porous or nonporous metal foil laminated to the microporous web.

9. An ultracapacitor having multiple layers, comprising:
a separator layer positioned between first and second porous electrode layers, each of which includes a mixture of ultrahigh molecular weight polyolefin;
each of the first and second porous electrode layers including a polymer matrix binding a material composition having electrical conductivity properties, the polymer matrix including an ultrahigh weight polyolefin and one of a carbonaceous material and a metal oxide, or a combination thereof, and the ultrahigh molecular weight polyolefin being of a molecular weight that provides sufficient molecular chain entanglement to form a microporous web with freestanding characteristics;
a pair of current collectors each of which is bonded to a different one of the first and second porous electrode layers; and
an electrolyte in contact with the multiple layers.

10. The ultracapacitor of claim 9, in which the ultrahigh molecular weight polyolefin is ultrahigh molecular weight polyethylene.

11. The ultracapacitor of claim 10, in which the ultrahigh molecular weight polyethylene in the electrode layers is present in an amount equal to or less than about 20 percent by volume.

12. The ultracapacitor of claim 9, which the separator layer includes an ultrahigh molecular weight polyolefin.

13. The ultracapacitor of claim 12, in which the ultrahigh molecular weight polyolefin is ultrahigh molecular weight polyethylene.

14. The ultracapacitor of claim 9, in which the material composition contains one of carbon aerogel, ruthenium oxide, manganese dioxide, nickel oxide, or tantalum oxide.

15. The ultracapacitor of claim 9, in which the electrode layers exhibit pseudocapacitance.

16. The ultracapacitor of claim 9, in which the first porous electrode layer exhibits pseudocapacitance and the second porous electrode layer exhibits double capacitance.

* * * * *